(12) United States Patent
Yamazaki

(10) Patent No.: US 11,312,013 B2
(45) Date of Patent: Apr. 26, 2022

(54) ROBOT SYSTEM AND ROBOT CONTROL METHOD

(71) Applicant: Seiko Epson Corporation, Tokyo (JP)

(72) Inventor: Takema Yamazaki, Fujimi (JP)

(73) Assignee: Seiko Epson Corporation

( * ) Notice: Subject to any disclaimer, the term of this patent is extended or adjusted under 35 U.S.C. 154(b) by 304 days.

(21) Appl. No.: 16/724,505

(22) Filed: Dec. 23, 2019

(65) Prior Publication Data

US 2020/0206915 A1 Jul. 2, 2020

(30) Foreign Application Priority Data

Dec. 26, 2018 (JP) .............................. JP2018-243389

(51) Int. Cl.
*G06F 17/00* (2019.01)
*B25J 9/16* (2006.01)
*B25J 19/00* (2006.01)

(52) U.S. Cl.
CPC ........... *B25J 9/161* (2013.01); *B25J 19/0004* (2013.01); *B25J 19/005* (2013.01)

(58) Field of Classification Search
CPC ...... B25J 9/161; B25J 19/0004; B25J 19/005; B25J 9/1602
USPC ........................................................ 700/245
See application file for complete search history.

(56) References Cited

U.S. PATENT DOCUMENTS

| | | | |
|---|---|---|---|
| 6,294,887 B1 | 9/2001 | Shimogama et al. | |
| 10,245,729 B2 * | 4/2019 | Bordegnoni | B25J 9/1676 |
| 10,753,738 B2 * | 8/2020 | Wakabayashi | B25J 19/022 |
| 10,771,085 B2 * | 9/2020 | Sekita | H04N 5/378 |
| 10,857,675 B2 * | 12/2020 | Kobayashi | B25J 13/085 |
| 11,027,428 B2 * | 6/2021 | Nishitani | G06F 30/20 |
| 11,040,451 B2 * | 6/2021 | Shiraishi | B25J 9/1669 |
| 11,040,453 B2 * | 6/2021 | Hino | B25J 9/1697 |
| 11,130,227 B2 * | 9/2021 | Toshimitsu | B25J 9/0084 |
| 11,154,987 B2 * | 10/2021 | Miyazawa | B25J 13/086 |
| 2017/0334070 A1 * | 11/2017 | Bordegnoni | B25J 19/065 |

FOREIGN PATENT DOCUMENTS

| | | |
|---|---|---|
| JP | 2000-296492 A | 10/2000 |
| JP | 2011-062792 A | 3/2011 |

* cited by examiner

*Primary Examiner* — Ronnie M Mancho
(74) *Attorney, Agent, or Firm* — Harness, Dickey & Pierce, P.L.C.

(57) ABSTRACT

In a robot system, a control device includes a power supplier and a main controller; a robot includes a first controller releasing the braking of a first drive portion by a first braker through a supply of a current from the power supplier and a second controller releasing the braking of a second drive portion by the second braker through a supply of a current from the power supplier; the main controller causes the first controller and the second controllers to release the braking by the first braker and the second braker; a power line coupling the power supplier, the first controller, and the second controller to each other is in a daisy chain coupling; and a first release timing at which the first controller releases the braking by the first braker is different from a second release timing at which the second controller releases the braking by the second braker.

9 Claims, 9 Drawing Sheets

| AXIS | CURRENT VALUE | |
| --- | --- | --- |
| | OVEREXCITATION | HOLDING EXCITATION |
| J1 | 0.33A | 0.10A |
| J2 | 0.33A | 0.10A |
| J3 | 0.33A | 0.10A |
| J4 | 0.50A | 0.15A |
| J5 | 0.50A | 0.15A |
| J6 | 0.50A | 0.15A |

ROBOT SYSTEM AND ROBOT CONTROL METHOD

The present application is based on, and claims priority from, JP Application Serial Number 2018-243389, filed Dec. 26, 2018, the disclosure of which is hereby incorporated by reference herein in its entirety.

BACKGROUND

1. Technical Field

The present disclosure relates to a robot system and a robot control method.

2. Related Art

A robot having a plurality of axes is known. The robot is provided with a motor and a brake for each axis.

For example, in the robot, each of two or more axes may be provided with an electromagnetic brake for holding an attitude of an arm.

In the following, the present specification will describe a case where an electromagnetic brake in which an overexcitation control is performed is used as an electromagnetic brake.

Such a brake prevents the robot from moving and taking an unintended attitude to come into contact with an object by gravity, vibration, or the like when the robot is short-circuited or a motor is de-excited, for example.

JP-A-2011-62792 discloses a robot including a plurality of brakes.

However, in the robot, when a power line coupling brakes of a plurality of axes to each other is in a daisy chain coupling, if brakes of all the axes are released at the same time when a motor is turned from OFF to ON, a large current flows through the power line to generate a voltage drop caused by a wire resistance. Such a voltage drop occurs by a resistance component of a power line and an inrush current caused by an overexcitation control. Further, in a case where an error is detected when such a voltage drop occurs in the robot, the robot may stop due to the error.

SUMMARY

An aspect of the present disclosure is directed to a robot system including a robot and a control device controlling the robot, in which the control device includes a power supplier and a main controller; the robot includes a first drive portion, a first braker braking the first drive portion, a second drive portion, a second braker braking the second drive portion, a first controller releasing the braking of the first drive portion by the first braker through a supply of a current from the power supplier, a second controller releases the braking of the second drive portion by the second braker through a supply of a current from the power supplier; the main controller causes the first controller to release the braking by the first braker and causes the second controller to release the braking by the second braker; a power line coupling the power supplier, the first controller, and the second controller to each other is in a daisy chain coupling; and a first release timing at which the first controller releases the braking by the first braker is different from a second release timing at which the second controller releases the braking by the second braker.

Another aspect of the present disclosure is directed to a robot control method in a robot system including a robot and a control device controlling the robot in which the control device includes a power supplier and a main controller; the robot includes a first drive portion, a first braker braking the first drive portion, a second drive portion, a second braker braking the second drive portion, a first controller releasing the braking of the first drive portion by the first braker through a supply of a current from the power supplier, a second controller releasing the braking of the second drive portion by the second braker through a supply of a current from the power supplier; the main controller causes the first controller to release the braking by the firsts braker and causes the second controller to release the braking by the second braker; a power line coupling the power supplier, the first controller, and the second controller to each other is in a daisy chain coupling; and a first release timing at which the first controller releases the braking by the first braker is different from a second release timing at which the second controller releases the braking by the second braker.

DESCRIPTION OF EXEMPLARY EMBODIMENTS

Embodiments will be described with reference to drawings in the following.

First Embodiment

A first embodiment will be described.

Robot System

Figure 1:
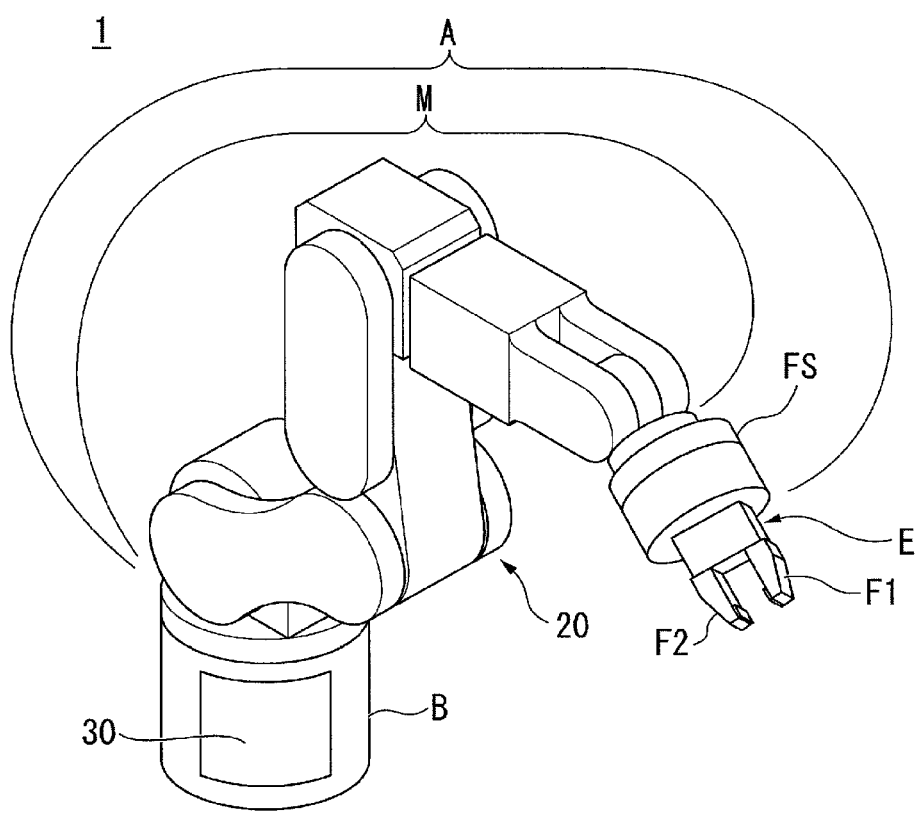
FIG. 1 is a view showing a schematic configuration of a robot system according to an embodiment.

FIG. 1 is a view showing a schematic configuration of a robot system 1 according to an embodiment.

The robot system 1 includes a robot 20 and a robot control device 30. In the example of FIG. 1, the robot control device 30 is built in the robot 20 and is positioned inside the robot 20.

Another example is a robot system 1 that may be configured to include a robot control device 30 installed outside the robot 20.

The robot system 1 may be configured to include one or more of an imager, an image processing device controlling the imager, an information processing device controlling the robot control device 30, a teaching device teaching the robot control device 30 a motion of the robot 20, and the like, for example.

The robot 20 is a six-axis robot.

The robot 20 is a single-arm robot including an arm A and a base B supporting the arm A. A single-arm robot is a robot having one arm such as the arm A.

The arm A includes an end effector E, a manipulator M, and a force measurer FS. The arm A may be configured not to include the end effector E. Further, the arm A may be configured not to include the force measurer FS.

The end effector E includes one or more fingers and a base portion supporting each of the one or more fingers and grips an object by pinching to hold the object with the one or more fingers. Further, the end effector E is provided with one or more fingers configured to move with respect to the base portion.

In the example of FIG. 1, the end effector E includes two fingers, a first finger F1 and a second finger F2.

The manipulator M is a vertically articulated manipulator having six joints. Each of the six joints included in the manipulator M includes an actuator (not shown). That is, the arm A including the manipulator M is a six-axis vertical articulated arm. The arm A performs a motion of six-axis degree of freedom by coordinated motions by the base B, the end effector E, the manipulator M, and the actuator of each of the six joints included in the manipulator M. The arm A may be configured to perform a motion of five-axis or less degree of freedom or may be configured to perform a motion of seven-axis or more degree of freedom.

The force measurer FS is provided between the end effector E and the manipulator M. The force measurer FS measures an external force acting on a hand of the robot 20.

Here, the hand of the robot 20 is the end effector E or an object gripped by the end effector E. That is, the force measurer FS measures an external force acting on the end effector E or an object gripped by the end effector E.

The measurement information of an external force is used in a force control of the robot 20 by the robot control device 30. The force control is a control based on an output value output from the force measurer FS, that is, a control based on measurement information of an external force output from the force measurer FS to the robot control device 30 and is a compliant motion control such as an impedance control or the like, for example.

Here, each of the six actuators included in the manipulator M and the force measurer FS are communicably coupled to the robot control device 30 by a cable. Wired communication by a cable is performed in accordance with a standard such as Ethernet (registered trademark) or Universal Serial Bus (USB).

The robot control device 30 controls the robot 20. The robot control device 30 causes the robot 20 to perform a predetermined operation based on a motion program stored in advance in a memory included in the robot control device 30. In the example of FIG. 1, the memory is omitted.

The robot control device 30 causes the arm A to perform a motion by a position control based on the motion program, for example.

Further, the robot control device 30 acquires measurement information of an external force from the force measurer FS and causes the arm A to perform a motion by a force control based on the acquired measurement information of an external force and the motion program.

Hardware Configuration of Robot Controller

A hardware configuration of the robot control device 30 will be described.

The robot control device 30 includes a processor, a memory, and a communication interface, for example. These components are communicably coupled to each other through a bus. The robot control device 30 communicates with the robot 20 through a communication interface.

The processor is a central processing unit (CPU), for example. The processor 31 may be another processor such as a field-programmable gate array (FPGA) instead of the CPU. The processor executes various programs stored in the memory.

The memory may include a hard disk drive (HDD), a solid-state drive (SSD), an electrically erasable programmable read-only memory (EEPROM), a read-only memory (ROM), a random access memory (RAM), or the like, for example. The memory may be an external storage device coupled to the robot control device 30 through a digital input/output port such as a USB instead of the one built in the robot control device 30, for example. The memory stores various information, motion programs, and the like to be processed by the robot control device 30.

The communication interface is configured to include a digital input/output port such as a USB, an Ethernet (registered trademark) port, or the like, for example.

The robot control device 30 may be configured to include either or both of the input devices such as a keyboard, a mouse, and a touchpad and a display device having a display screen.

Functional Configuration of Robot Control Device

Figure 2:
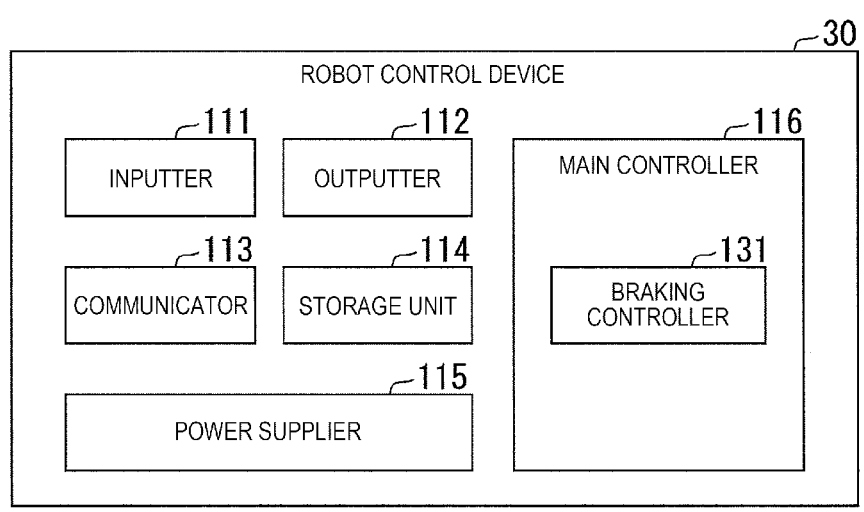
FIG. 2 is a view showing a functional configuration of a robot control device according to a first embodiment.

FIG. 2 is a view showing a functional configuration of a robot control device 30 according to a first embodiment.

The robot control device 30 includes an inputter 111, an outputter 112, a communicator 113, a storage unit 114, a power supplier 115, and a main controller 116.

The main controller 116 includes a braking controller 131.

The main controller 116 is an example of a controller and may be called by another name.

The inputter 111 inputs information from the outside.

An example is an inputter 111 that includes an operator receiving contents of an operation performed by a user and inputs information showing contents of the operation received by the operator. The operator may be a keyboard or a mouse, for example. The user is a person, for example.

Another example is an inputter 111 that is coupled to an external device and that inputs information output from the external device.

The outputter 112 outputs information to the outside.

An example is an outputter 112 outputting information by displaying the information on a screen. Another example is an outputter 112 outputting information in the form of a sound through a speaker.

Still another example is an outputter 112 that is coupled to an external device and that outputs information to the external device.

The communicator 113 has a communication interface. The communicator 113 communicates with equipment included in the robot 20. Further, the communicator 113 may communicate with equipment included in a place other than the robot 20. In the present embodiment, the communicator 113 has a function of performing communication by a controller area network (CAN).

The storage unit 114 has a predetermined memory. The storage unit 114 stores various types of information.

The power supplier 115 supplies power to the equipment provided in the robot 20. Further, the power supplier 115 may supply power to equipment provided in a place other than the robot 20. The power source of the power supplied by the power supplier 115 may be a power source existing outside the robot 20 or may be a battery included inside the robot 20, for example. Using a pulse width modulation (PWM) control, the power supplier 115 may adjust power to be supplied, for example.

The main controller 116 has a processor. The main controller 116 performs various controls on the robot 20.

The braking controller 131 controls the braker provided in the robot 20.

In the present embodiment, the control of the braker will be described in detail, and the main controller 116 may control the drive portion provided in the robot 20, for example.

Configuration Related to Driving of Six Axes

Figure 3:
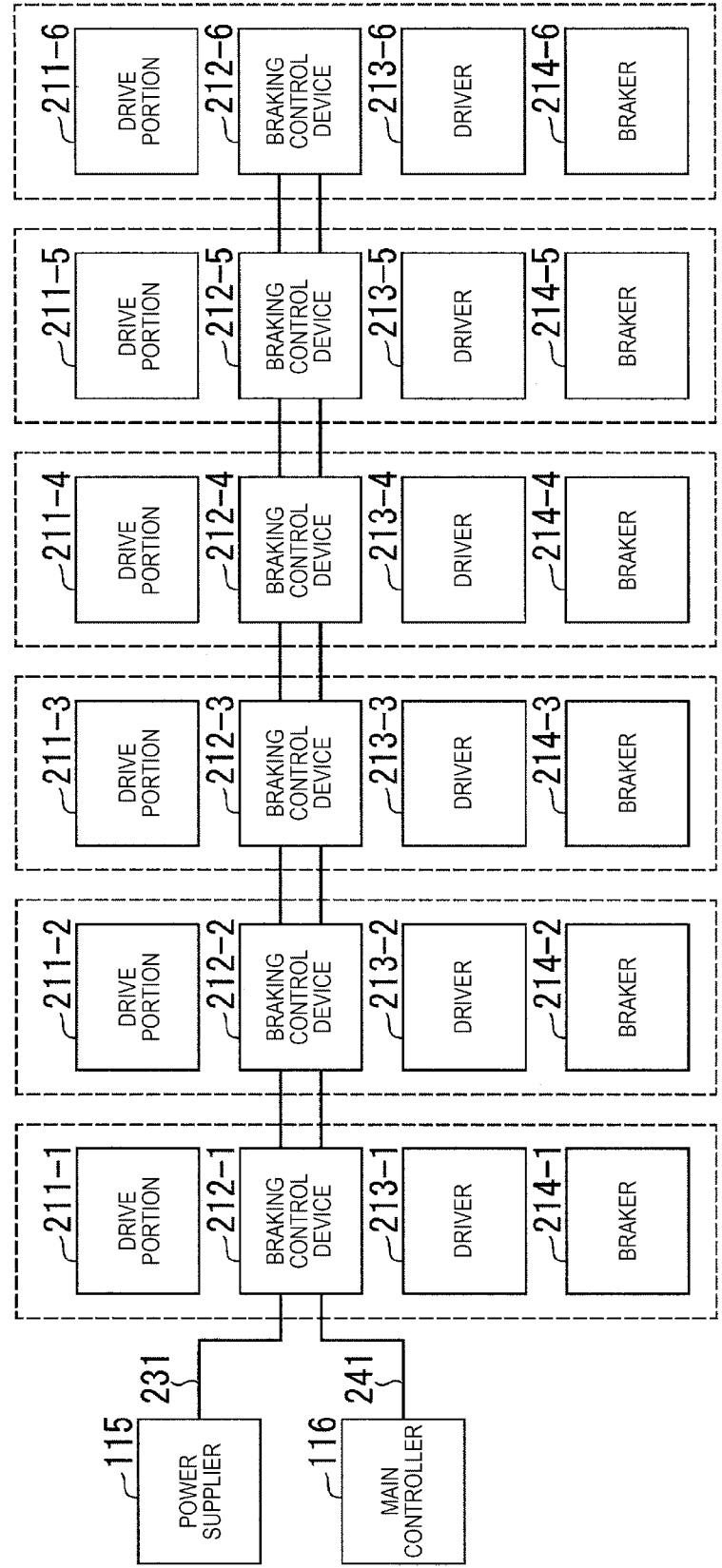
FIG. 3 is a view showing a configuration related to driving of six axes according to the first embodiment.

FIG. 3 is a view showing a configuration related to driving of six axes according to the first embodiment.

The robot 20 includes six drive portions 211-1 to 211-6, six braking control devices 212-1 to 212-6, six drivers 213-1 to 213-6, and six brakers 214-1 to 214-6. The robot 20 includes a power line 231 and a communication line 241.

Here, the robot 20 is provided with one drive portion 211-$i$, one braking control device 212-$i$, one driver 213-$i$ and one braker 214-$i$ for an i-th axis, i being an integer from 1 to 6.

In the present embodiment, the drive portion 211-$i$, the braking control device 212-$i$, the driver 213-$i$, and the braker 214-$i$ are the same or, different but approximately the same, in ratings for each of the six axes.

In the present embodiment, for the convenience of description, the axes are arranged, in order of the first axis, the second axis, the third axis, the fourth axis, the fifth axis, and the sixth axis, from a side close to the base B of the robot 20 to a side close to the end effector E equivalent to a fingertip which is a tip. That is, the first axis is arranged on the base B or in a portion close to the base B in the arm A and the sixth axis is arranged in a portion close to the end effector E in the arm A. The second axis to the fifth axis are arranged therebetween in order of the second axis to fifth axis.

The power line 231 is a wired cable and is configured to couple the six braking control devices 212-1 to 212-6 in a daisy chain coupling in order of the first axis to the sixth axis. The power supplier 115 of the robot control device 30 is coupled in a daisy chain coupling to the six braking control devices 212-1 to 212-6 by the power line 231.

In the example of FIG. 3, a reference numeral is assigned one power line 231, but the power line 231 may be configured with two or more cables, for example.

Here, the daisy chain coupling couples a plurality of equipment in a manner of threading rosary beads, for example.

In the present embodiment, an output end of the power supplier 115 and an input end of the first braking control device 212-1 are coupled to each other. Also, an output end of the first braking control device 212-1 and an input end of the second braking control device 212-2 are coupled to each other. Similarly, the third braking control device 212-3, the fourth braking control device 212-4, and the fifth braking control device 212-5 are coupled to a tip of the second braking control device 212-2. An output end of the fifth braking control device 212-5 is coupled to an input end of the sixth braking control device 212-6. Each of the braking control devices 212-1 to 212-5 has a path through which a power signal input from the input end is output from the output end. A bus connection may be used in the daisy chain coupling, for example.

Further, the present embodiment shows a case where, for each of the first axis to the sixth axis, the braking control devices 212-1 to 212-6 supply the power, input through the power line 231, to the drive portions 211-1 to 211-6 or the drivers 213-1 to 213-6 on the same axis and the drivers 213-1 to 213-6 supply the supplied power to the brakers 214-1 to 214-6 on the same axes. Another configuration may be used for the power supply.

The communication line 241 is a wired cable. The main controller 116 of the robot control device 30 and the six braking control devices 212-1 to 212-6 are coupled to each other in a daisy chain coupling by communication line 241. In the present embodiment, the main controller 116 of the robot control device 30 is communicably coupled to the six braking control devices 212-1 to 212-6 by CAN through the communication line 241.

The drive portions 211-1 to 211-6 drive each of the six axes. Each of the drive portions 211-1 to 211-6 is a motor.

The brakers 214-1 to 214-6 brake the driving of each of the six axes. In the present embodiment, each of the brakers 214-1 to 214-6 is an electromagnetic brake.

In the present embodiment, when a sufficient current is not received, the brakers 214-1 to 214-6 stop the rotation of the motors in a state of directly or indirectly pressing the rotators of the motors. On the other hand, when a sufficient current is received, the brakers 214-1 to 214-6 cancel the state of directly or indirectly pressing the rotators of the motors and maintain the rotation of the motors.

Here, another example of the braking performed by the brakers 214-1 to 214-6 may be a mode in which the rotator of the motor is directly or indirectly pressed by the brakers 214-1 to 214-6 after the rotator of the motor is stopped by a command from the main controller 116.

The drivers 213-1 to 213-6 drive the brakers 214-1 to 214-6 of the six axes respectively.

Each of the braking control devices 212-1 to 212-6 is configured to use a computer such as a microcomputer, for example.

The braking control devices 212-1 to 212-6 control, through the drivers 213-1 to 213-6, the braking performed by the brakers 214-1 to 214-6 for each of the six axes. In the present embodiment, the braking control devices 212-1 to 212-6 release, by supply of a current from the power supplier 115, the braking of the drive portions 211-1 to 211-6 by the brakers 214-1 to 214-6.

In the present embodiment, each of the braking control devices 212-1 to 212-6 includes a drive electric circuit for releasing the electromagnetic brakes which are the respective brakers 214-1 to 214-6. Then, the power line 231 which is a wire for supplying source power is coupled to these drive electric circuits in a daisy chain coupling, and, in this way, wiring is economized inside the arm A.

Here, the drive portion 211-1 to 211-6 of the respective axes may be provided at any position of the robot 20, may be provided in the base B, or may be provided in the arm A.

Usually, the drive portions 211-1 to 211-6 of the respective axes are provided at positions relatively close to the respective axes.

Further, for each axis, the braking control device 212-1 to 212-6, the drivers 213-1 to 213-6, and the brakers 214-1 to 214-6 are provided in the vicinity of each other, for example.

Further, for each axis, the braking control device 212-1 to 212-6, the drivers 213-1 to 213-6, and the brakers 214-1 to 214-6 are provided in the vicinity of the drive portions 211-1 to 211-6, for example.

The power line 231 transmits power supplied from the power supplier 115 of the robot control device 30. In the present embodiment, the power is used, as power for controlling the brakers 214-1 to 214-6 of the respective axes, in the drivers 213-1 to 213-6 and the braking control devices 212-1 to 212-6. As described above, in the present embodiment, the power of a brake and the power for controlling the brake are transmitted by the common power line 231, so that there is a single power cable passing through the joint to release the brake.

The voltage of power supplied from the power supplier 115 may be converted into a different voltage for use by either or both of the drivers 213-1 to 213-6 and the braking control devices 212-1 to 212-6. The voltage conversion may be performed by using a regulator, for example.

For example, the voltage of the power supplied from the power supplier 115 is 24 [V], the voltage used in the braking control devices 212-1 to 212-6 is 5[V], and the voltage used in the drivers 213-1 to 213-6 is 24[V].

A cable for communicating a signal to control a portion other than the brakers 214-1 to 214-6 in the robot 20 may be used as the communication line 241, for example. In this case, the common communication line 241 is used for the signal to control the portion other than the brakers 214-1 to 214-6 and the signal to control the brakers 214-1 to 214-6 in the robot 20. Thus, wiring is economized.

The power supplier 115 of the robot control device 30 supplies power through the power line 231.

The braking controller 131 in the main controller 116 of the robot control device 30 transmits, through the communication line 241, a signal to control the release of braking by the brakers 214-1 to 214-6 to the braking control devices 212-1 to 212-6 for each axis.

In the present embodiment, at a time when releasing the braking by the brakers 214-1 to 214-6 is required, the braking controller 131 transmits, through the communication line 241, a signal to release the braking by the brakers 214-1 to 214-6 to the braking control devices 212-1 to 212-6 for each axis. In this way, the braking controller 131 causes the braking control devices 212-1 to 212-6 to release the braking by the brakers 214-1 to 214-6.

In the present embodiment, the braking controller 131 in the main controller 116 of the robot control device 30 can perform any control on the timing, the magnitude of the current, the magnitude of the voltage, and the like related to a release of the braking by the brakers 214-1 to 214-6.

Functional Configuration of Braking Control Device

In the present embodiment, the motions performed by the braking control devices 212-1 to 212-6 of the six axes are the same. Therefore, the braking control device 212-1 of one axis will be described as a representative.

Figures 4, 5:
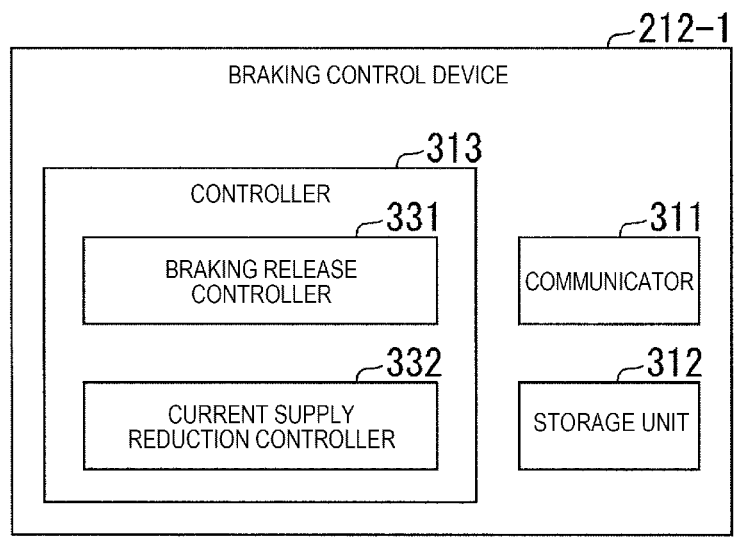
FIG. 4 is a view showing a functional configuration of the braking control device according to the first embodiment.
FIG. 5 is a view showing current values for controlling six axes according to the first embodiment.

FIG. 4 is a view showing a functional configuration of the braking control device 212-1 according to the first embodiment.

The braking control device 212-1 includes a communicator 311, a storage unit 312, and a controller 313.

The controller 313 includes a braking release controller 331 and a current supply reduction controller 332.

The communicator 311 communicates signals through the communication line 241. In the present embodiment, the communicator 311 has a function of performing communication by CAN.

The storage unit 312 stores various types of information.

The controller 313 performs various controls.

When the communicator 311 receives a signal transmitted from the main controller 116 of the robot control device 30 to the braking release controller 331 through the communication line 241, the braking release controller 331 performs control according to the content of the signal. For example, when the content of the signal is a command to release the braking by the braker 214-1, the braking release controller 331 performs a control for releasing the braking by the braker 214-1.

In the present embodiment, the braking release controller 331 controls to flow, through the braker 214-1, a current having a magnitude equal to or greater than a predetermined threshold value and releases the braking by the braker 214-1.

In the present embodiment, the time required for the braking release controller 331 to release the braking after receiving a command to release the braking by the brakers 214-1 to 214-6 for the respective axes is the same or about the same for all the axes.

After the braking release controller 331 flows, through the braker 214-1, a current having a magnitude equal to or greater than a predetermined threshold value and releases the braking by the braker 214-1, the current supply reduction controller 332 performs a control to reduce the magnitude of the current. That is, in the present embodiment, it is necessary to flow a current equal to or greater than a predetermined threshold value in an initial stage to release the braking by the electromagnetic brake which is the braker 214-1, and once the braking is released, the released state is maintained even if the magnitude of the current is reduced. Therefore, in the present embodiment, after the braking by the braker 214-1 is released, the current supply reduction controller 332 reduces the magnitude of the current flowing through the braker 214-1 to a predetermined value smaller than the predetermined threshold value at a predetermined timing.

In this way, in the present embodiment, in the braking control device 212-1, after a release timing which is a time at which the braking by the braker 214-1 is released, the current supply reduction controller 332 controls a reduction timing which is a timing at which the current supply from the current supplier 115 to the braker 214-1 is reduced.

Here, in the present embodiment, the release timing is a start timing at which an overexcitation current starts to flow.

In the present embodiment, the reduction timing is a start timing at which a holding excitation current starts to flow after the overexcitation.

Here, the predetermined threshold value, the predetermined value, and the timing at which the magnitude of the current is reduced from the predetermined threshold value to the predetermined value are set in advance in the braking control device 212-1, for example.

Another example is a braking controller 131 in the main controller 116 of the robot control device 30 that may control the predetermined threshold value, the predetermined value, and the timing at which the magnitude of the current is reduced from the predetermined threshold value to the predetermined value.

In this way, the magnitude of the current to release the braking by the braker 214-1 is reduced after the braking is released, and the released state is maintained to reduce the power consumption.

The example of FIG. 4 shows, for the convenience of description, the function of the braking release controller 331 and the function of the current supply reduction controller 332 separately, and these functions may be integrated, for example.

Example of Current Values for Controlling Six Axes

FIG. 5 is a view showing current values for controlling the six axes according to the first embodiment.

In FIG. 5, a current value table 1011 storing current values for controlling six axes is shown.

In the present embodiment, the current value table 1011 is stored in the storage unit 114 of the robot control device 30. Then, the braking controller 131 in the main controller 116 of the robot control device 30 performs a control for each axis based on the contents of the current value table 1011.

In the present embodiment, for the convenience of description, the i-th axis is also referred to as "Ji".

In the example of FIG. 5, the current value table 1011 shows overexcitation current values and holding excitation current values for each of J1 to J6.

Here, for each of J1 to J6, the overexcitation current values correspond to the current values flowing through the brakers 214-1 to 214-6 in an initial stage when the braking by the brakers 214-1 to 214-6 is released from the state where the braking by the brakers 214-1 to 214-6 is not released. In the present embodiment, the current values are equal to or greater than predetermined threshold values for releasing the braking.

Further, for the respective J1 to J6, the current values of the holding excitation correspond to the current values flowing through the brakers 214-1 to 214-6 for maintaining the released state after the braking by the brakers 214-1 to 214-6 is released. In the present embodiment, the current values are predetermined values reduced from current values equal to or greater than predetermined threshold values for releasing the braking.

In the present embodiment, electromagnetic brakes of the same standard are used for the brakers 214-1 to 214-3 for J1 to J3, and electromagnetic brakes of the same standard are used for the brakers 214-4 to 214-6 for J4 to J6. Further, the standard of the electromagnetic brakes for J1 to J3 is different from the standard of the electromagnetic brakes for J4 to J6, and the electromagnetic brakes for J4 to J6 require a larger current.

In the present embodiment, for J1 to J3, the overexcitation current value is 0.33 [A] and the holding excitation current value is 0.10 [A].

In the present embodiment, for J4 to J6, the overexcitation current value is 0.50 [A] and the holding excitation current value is 0.15 [A].

First Pattern of Current Values for Controlling Six Axes

Figure 6:
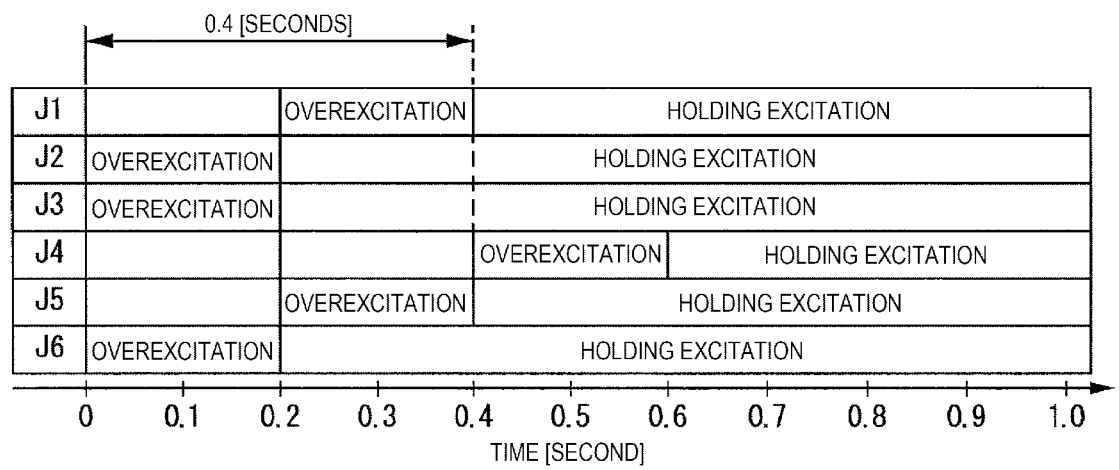
FIG. 6 is a view showing a first pattern of current values for controlling six axes according to the first embodiment.

FIG. 6 is a view illustrating a first pattern of current values for controlling the six axes according to the first embodiment.

In FIG. 6, an example of the time transition of the current values flowing through the brakers 214-1 to 214-6 for each of J1 to J6 is shown.

The horizontal axis shown in FIG. 6 represents the time [second]. Each of J1 to J6 is arranged in the direction of the vertical axis. For each of J1 to J6, the timing at which the current having the overexcitation current value flows and the timing at which the current having the holding excitation current value flows are shown.

In the example of FIG. 6, for the convenience of description, the timing at which the current having the overexcitation current value starts flowing first among J1 to J6 is set to 0 [second].

In the example of FIG. 6, J2, J3, and J6 are in an overexcitation state from 0 [second] to 0.2 [seconds] and in a holding excitation state after 0.2 [seconds]. J1 and J5 are in the overexcitation state from 0.2 [seconds] to 0.4 [seconds] and in the holding excitation state after 0.4 [seconds]. J4 is in the overexcitation state from 0.4 [seconds] to 0.6 [seconds] and in the holding excitation state after 0.6 [seconds].

Figure 7:
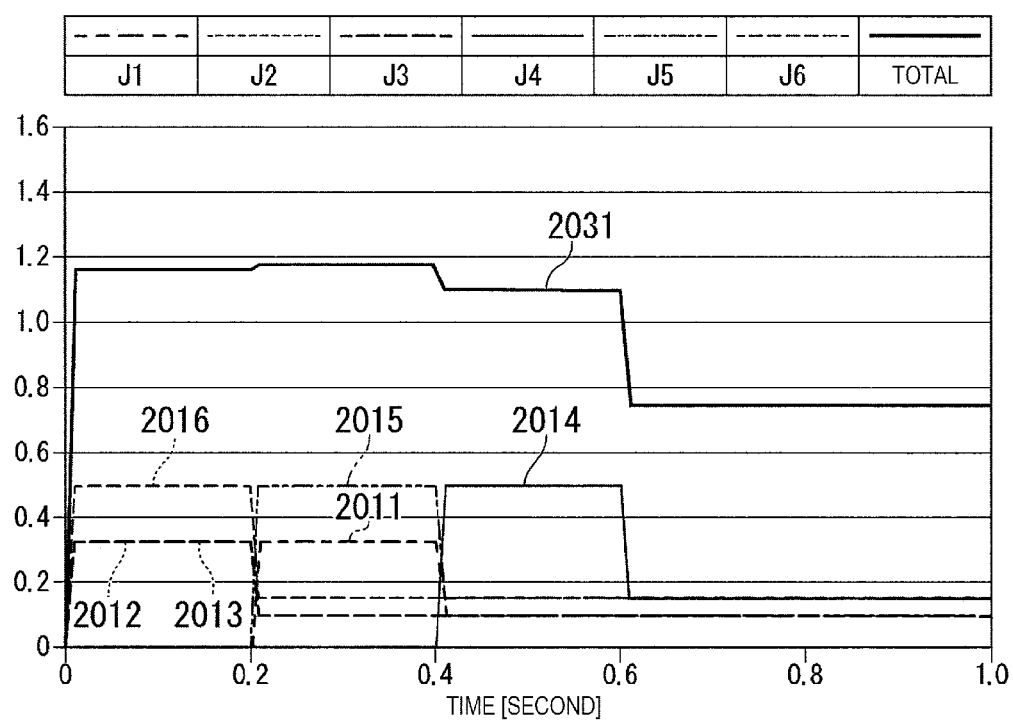
FIG. 7 is a view showing a first pattern of a temporal change in current values for controlling six axes according to the first embodiment.

FIG. 7 is a view showing a first pattern of a temporal change in current values for controlling the six axes according to the first embodiment.

The example of FIG. 7 corresponds to the example of FIG. 6.

In the graph shown in FIG. 7, the horizontal axis represents time [second] like the horizontal axis shown in FIG. 6. The vertical axis represents the current value. In the example of FIG. 7, for the convenience of description, the current flowing through the brakers 214-1 to 214-6 is referred to as "brake current".

In the example of FIG. 7, the current value characteristic 2011 of the current flowing through the braker 214-1 for J1, the current value characteristic 2012 of the current flowing through the braker 214-2 for J2, the current value characteristic 2013 of the current flowing through the braker 214-3 for J3, the current value characteristic 2014 of the current flowing through the braker 214-4 for J4, the current value characteristic 2015 of the current flowing through the braker 214-5 for J5, and the current value characteristic 2016 of the current flowing through the braker 214-6 for J6 are shown. Further, in the example of FIG. 7, a characteristic 2031 of the total value of the current values of the currents flowing through the six brakers 214-1 to 214-6 of J1 to J6 are shown.

As shown in FIG. 7, in the example of FIGS. 6 and 7, the total value of the current values of the currents flowing through the six brakers 214-1 to 214-6 of J1 to J6 is adjusted to be equal to or less than a predetermined upper limit value. In the present example, the predetermined upper limit value is 1.5 [A]. In the example of FIGS. 6 and 7, the maximum value of the total value is 1.18 [A].

Here, in the present embodiment, due to the common impedance of the power line 231 which is a wire, the voltage drop is larger at the fingertip among J1 to J6. Therefore, the braking controller 131 performs a control of releasing the braking by the brakers 214-1 to 214-6, giving priority to the axis on the fingertip side. In other words, the braking controller 131 performs a control of releasing the braking by the brakers 214-1 to 214-6 by giving priority to the last axis of the daisy chain coupling.

In the example of FIGS. 6 and 7, the electromagnetic brakes of J1 to J3 and the electromagnetic brakes of J4 to J6 are different from each other, so that priority is given to the axis on the fingertip side for J1 to J3 to release the braking by the brakers 214-1 to 214-3 and priority is given to the axis on the fingertip side for J4 to J6 to release the braking by the brakers 214-4 to 214-6. In other words, the configuration is such that, for the same type of brakes, the axis on the fingertip side is released from the braking earlier. Then, J4 to J6 which are closer to the fingertip than J1 to J3 are given priority so that overlapping with the axes of which the braking release timing is different is avoided.

In the example of FIGS. 6 and 7, the release timing is the same for J2 and J3. In this way, the release timings of the axes adjacent to each other may be the same.

In the example of FIGS. 6 and 7, J2, J3, and J6, J1 and J5, and J4 have release timings different from each other, which are the timings at which the braking control devices 212-1 to 212-6 release the braking of the brakers 214-1 to 214-6. In the present example, J2, J3, and J6 have the same release timings, and J1 and J5 have the same release timings.

In the example of FIGS. 6 and 7, a case is shown where J2, J3, and J6 have the same reduction timings and J1 and J5 have the same reduction timings, and another example is a configuration in which one or more of J2, J3, and J6 may have different reduction timings or J1 and J5 may have different reduction timings.

Further, in the examples of FIGS. 6 and 7, the axis on the side of the fingertip is given priority and the release timing is arranged to be earlier for J1 to J3, and the axis on the finger side is given priority and the release timing is arranged to be earlier for J4 and J6.

Second Pattern of Current Values for Controlling Six Axes

Figure 8:
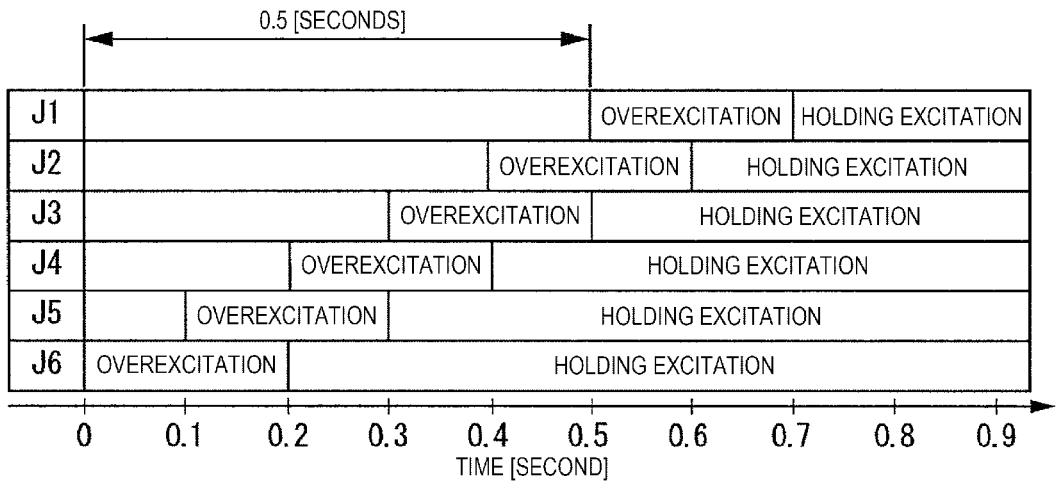
FIG. 8 is a view showing a second pattern of current values for controlling six axes according to the first embodiment.

FIG. 8 is a view showing a second pattern of current values for controlling the six axes according to the first embodiment.

In FIG. 8, an example of the temporal transition of the current values flowing through the brakers 214-1 to 214-6 for each of J1 to J6 is shown.

The horizontal axis shown in FIG. 8 represents time [second]. Each of J1 to J6 is arranged in the direction of the vertical axis. For each of J1 to J6, the timing at which the current having the overexcitation current value flows and the timing at which the current having the holding excitation current value flows are shown.

In the example of FIG. 8, for the convenience of description, the timing at which the current having the overexcitation current value starts flowing first among J1 to J6 is set to 0 [seconds].

In the example of FIG. 8, J6 is in the overexcitation state from 0 [seconds] to 0.2 [seconds] and in a holding excitation state after 0.2 [seconds]. J5 is in the overexcitation state from 0.1 [seconds] to 0.3 [seconds] and in the holding excitation state after 0.3 [seconds]. J4 is in an overexcitation state from 0.2 [seconds] to 0.4 [seconds] and in the holding excitation state after 0.4 [seconds]. J3 is in the overexcitation state from 0.3 [seconds] to 0.5 [seconds] and in a holding excitation state after 0.5 [seconds]. J2 is in the overexcitation state from 0.4 [seconds] to 0.6 [seconds] and in the holding excitation state after 0.6 [seconds]. J1 is in the overexcitation state from 0.5 [seconds] to 0.7 [seconds] and in the holding excitation state after 0.7 [seconds].

Figure 9:
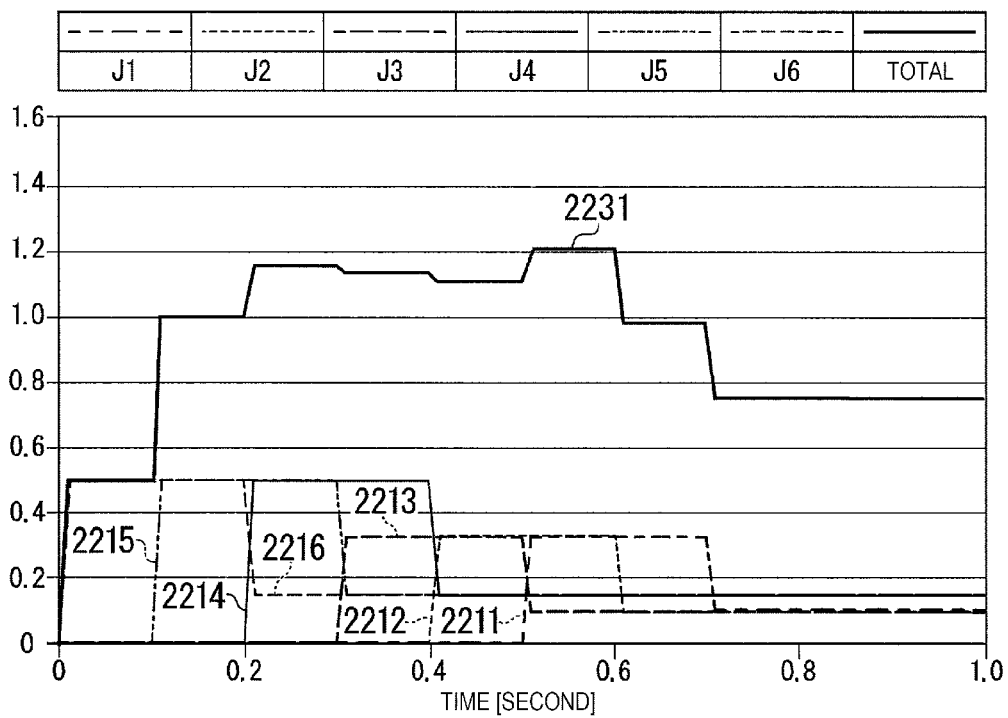
FIG. 9 is a view showing a second pattern of a temporal change in current values for controlling six axes according to the first embodiment.

FIG. 9 is a view showing a second pattern of a temporal change in the current values for controlling the six axes according to the first embodiment.

The example of FIG. 9 corresponds to the example of FIG. 8.

In the graph shown in FIG. 9, the horizontal axis represents time [seconds] like the horizontal axis shown in FIG. 8. The vertical axis represents the current value. In the example of FIG. 9, for the convenience of description, the current flowing through the brakers 214-1 to 214-6 is referred to as "brake current".

The example of FIG. 9 shows the current value characteristic 2211 of the current flowing through the braker 214-1 for J1, the current value characteristic 2212 of the current flowing through the braker 214-2 for J2, the current value characteristic 2213 of the current flowing through the braker 214-3 for J3, the current value characteristic 2214 of the current flowing through the braker 214-4 for J4, the current value characteristic 2215 of the current flowing through the braker 214-5 for J5, and the current value characteristic 2216 of the current flowing through the braker 214-6 for J6. Further, in the example of FIG. 9, a total value characteristic 2231 of the current values of currents flowing through the brakers 214-1 to 214-6 for J1 to J6 is shown.

As shown in FIG. 9, in the example of FIGS. 8 and 9, the total value of the current values of the currents flowing through the six brakers 214-1 to 214-6 for J1 to J6 is adjusted to be equal to or less than a predetermined upper limit value. In the present example, the predetermined upper limit value is 1.5 [A]. In the example of FIGS. 8 and 9, the maximum value of the total value is 1.21 [A].

Here, in the present embodiment, due to the common impedance of the power line 231 that is a wire, the voltage drop is larger on the side of the fingertip among J1 to J6. Therefore, the braking controller 131 performs a control of releasing the braking by the brakers 214-1 to 214-6, giving priority to the axis on the side of the fingertip. In other words, the braking controller 131 controls of releasing the braking by the brakers 214-1 to 214-6 by giving priority to the last axis on the side of the fingertip in the daisy chain coupling.

In the example of FIGS. 8 and 9, the configuration is such that the axis on the side of the fingertip is given priority so that the braking by the brakers 214-1 to 214-6 is released sequentially for J1 to J6.

In the example of FIGS. 8 and 9, the release timings at which the braking control devices 212-1 to 212-6 release the braking by the brakers 214-1 to 214-6 are different from each other for J1, J2, J3, J4, J5, and J6.

In the present example, for two or more of J1 to J6, the overexcitation periods, which are the periods between the release timings and the reduction timings, partially overlap with each other. In other words, an overexcitation period of a certain axis overlaps with a part of an overexcitation period of another axis. In this way, it is possible to shorten the time required to release the braking by the brakers 214-1 to 214-6 for all the axes J1 to J6. The part mentioned here does not include the whole.

In the example of FIGS. 8 and 9, J1 to J6, priority is given to the axis on the side of the fingertip side such that the release timing thereof is earlier. In this way, in the present example, the release timings are arranged to be earlier in order of closeness of the brakers 214-1 to 214-6 of the joints to the tip of the arm A of the robot 20, and, in this way, it is possible to suppress the magnitude of the peak current.

Third Pattern of Current Values for Controlling Six Axes

Figure 10:
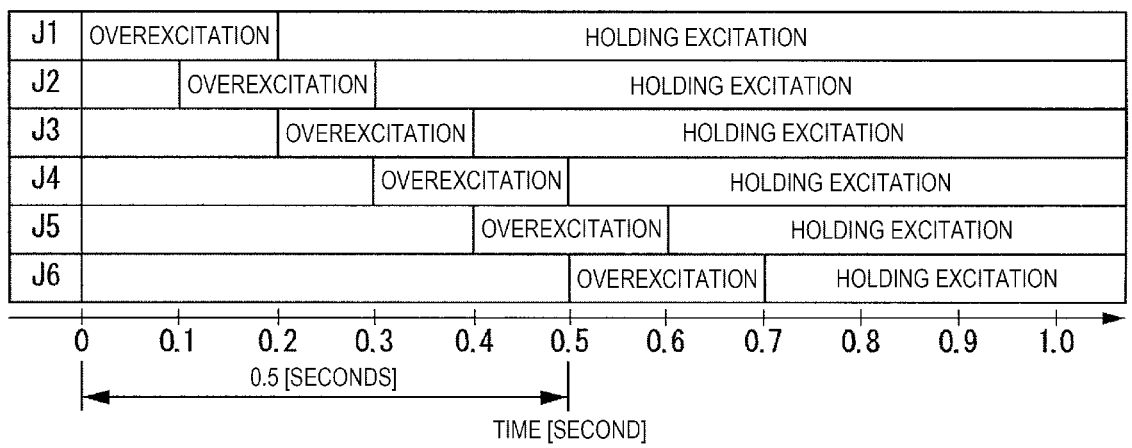
FIG. 10 is a view showing a third pattern of current values for controlling six axes according to the first embodiment.

FIG. 10 is a view showing a third pattern of current values for controlling the six axes according to the first embodiment.

FIG. 10 shows an example of the temporal transition of the current values flowing through the brakers 214-1 to 214-6 for each of J1 to J6. The horizontal axis shown in FIG. 10 represents time [seconds]. Each of J1 to J6 is arranged in the direction of the vertical axis. For each of J1 to J6, the timing at which the current having the overexcitation current value flows and the timing at which the current having the holding excitation current value flows are shown.

In the example of FIG. 10, for the convenience of description, the timing at which the current having the overexcitation current value starts to flow first among J1 to J6 is set to 0 [seconds].

In the example of FIG. 10, J1 is in the overexcitation state from 0 [seconds] to 0.2 [seconds] and in the holding excitation state after 0.2 [seconds]. J2 is in the overexcitation state from 0.1 [seconds] to 0.3 [seconds] and in the holding excitation state after 0.3 [seconds]. J3 is in the overexcitation state from 0.2 [seconds] to 0.4 [seconds] and in the holding excitation state after 0.4 [seconds]. J4 is in the overexcitation state from 0.3 [seconds] to 0.5 [seconds] and in the holding excitation state after 0.5 [seconds]. J5 is in the overexcitation state from 0.4 [seconds] to 0.6 [seconds] and in the holding excitation state after 0.6 [seconds]. J6 is in the overexcitation state from 0.5 [seconds] to 0.7 [seconds] and in the holding excitation state after 0.7 [seconds].

Figure 11:
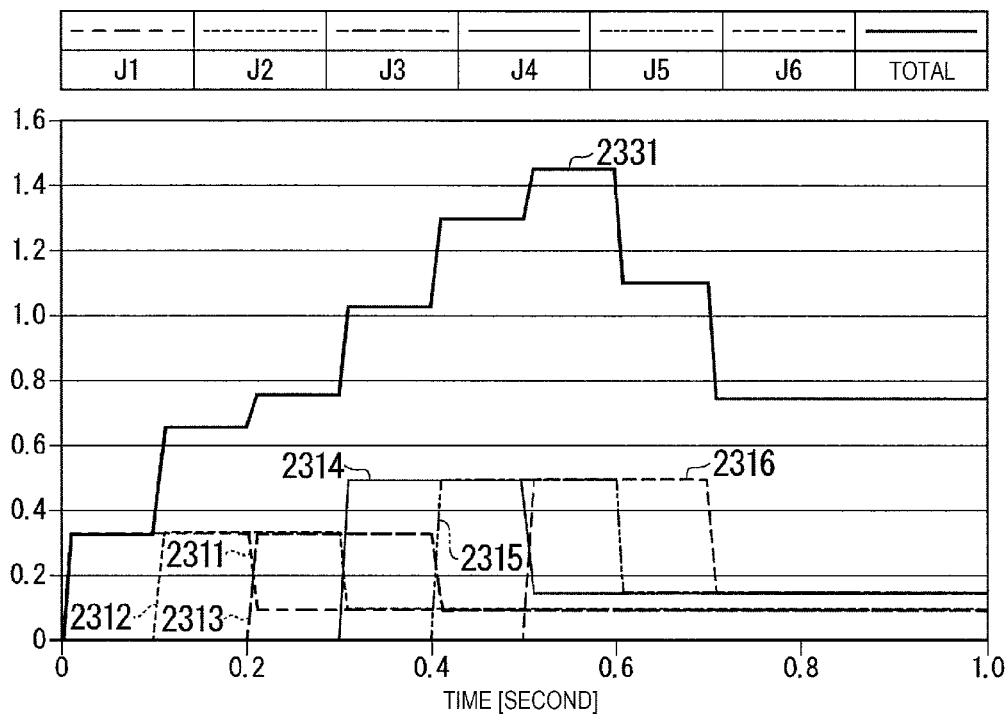
FIG. 11 is a view showing a third pattern of a temporal change in current values for controlling six axes according to the first embodiment.

FIG. 11 is a view showing a third pattern of a temporal change in current values for controlling the six axes according to the first embodiment.

The example of FIG. 11 corresponds to the example of FIG. 10.

In the graph shown in FIG. 11, the horizontal axis represents time [seconds] like the horizontal axis shown in FIG. 10. The vertical axis represents the current value. In the example of FIG. 11, for the convenience of description, the current flowing through the brakers 214-1 to 214-6 is referred to as "brake current".

The example of FIG. 11 shows the current value characteristic 2311 of the current flowing through the braker 214-1 for J1, the current value characteristic 2312 of the current flowing through the braker 214-2 for J2, the current value characteristic 2313 of the current flowing through the braker 214-3 for J3, the current value characteristic 2314 of the current flowing through the braker 214-4 for J4, the current value characteristic 2315 of the current flowing through the braker 214-5 for J5, and the current value characteristic 2316 of the current flowing through the braker 214-6 for J6. Further, the example of FIG. 11 shows a total value characteristic 2331 of the current flowing through the six brakers 214-1 to 214-6 for J1 to J6.

As shown in FIG. 11, in the example of FIGS. 10 and 11, the total value of the current values of the currents flowing through the six brakers 214-1 to 214-6 of J1 to J6 is adjusted to be equal to or less than a predetermined upper limit value. In the present example, the predetermined upper limit value is 1.5 [A]. In the example of FIGS. 10 and 11, the maximum value of the total value is 1.45 [A].

In FIGS. 10 and 11, the configuration is such that the axis on the side of the base B which is not a fingertip is given priority so that a control of sequentially releasing the braking by the brakers 214-1 to 214-6 is performed. Even in such a configuration, it is possible to suppress the magnitude of the total value of the current values of the currents flowing through the six brakers 214-1 to 214-6 of J1 to J6.

In the example of FIGS. 10 and 11, the release timings at which the braking control devices 212-1 to 212-6 release the braking of the brakers 214-1 to 214-6 are different from each other for J1, J2, J3, J4, J5, and J6.

In the present example, for two or more of J1 to J6, the overexcitation periods which are the periods between the release timings and the reduction timings partially overlap with each other. In other words, a part of an overexcitation period of a certain axis overlaps with a part of an overexcitation period of another axis. In this way, it is possible to shorten the time required to release the braking of the brakers 214-1 to 214-6 for all the axes J1 to J6. The part mentioned here does not include the whole.

Further, in the example of FIGS. 10 and 11, the axis on the side of the root is given priority and the release timing is arranged to be earlier for J1 to J6.

Regarding First Pattern to Third Pattern

In the first pattern to the third pattern, when the braking by the six brakers 214-1 to 214-6 of J1 to J6 is released, the overexcitation timing of each axis is adjusted so that the total value of the current values of the currents flowing through the six brakers 214-1 to 214-6 becomes 1.5 [A] or less. The first pattern to the third pattern show a case where the overexcitation period is 0.2 [seconds] for J1 to J6.

Here, the release timing of the braking by the six brakers 214-1 to 214-6 of J1 to J6 is not limited to the first pattern to the third pattern, and various patterns may be used.

For each axis, any value may be used as the overexcitation current value and the holding excitation current value respectively.

Further, the overexcitation period for each axis may be any period, and each axis may have a period different from each other, for example.

The present embodiment shows an example of control for the six axes, and various patterns may be used for the control of two to five axes or the control of seven or more axes.

Regarding the First Embodiment

As described above, in the robot system 1 according to the present embodiment, when the braking by the brakers 214-1 to 214-6 for a plurality of axes included in the robot 20 is released, the robot control device 30 controls to adjust the overexcitation timing, so that it is possible to suppress the occurrence of a voltage drop caused by the overexcitation. In this way, it is possible to suppress the occurrence of the error and it is possible to suppress the stop of the robot 20 caused by the occurrence of the error when a voltage drop error is detected in the amplifiers of the driver portions 211-1 to 211-6.

Here, according to Ohm's law, the voltage drop in the conductive wire is determined by a product of the resistance of the conductive wire and the current. In the robot system 1 according to the present embodiment, a peak of the current flowing through the power line 231 which is a conductive wire is suppressed. In this way, in the robot system 1 according to the present embodiment, it is possible to restrain the power supply from exceeding the allowable current when the braking by the brakers 214-1 to 214-6 is released.

Further, in the robot system 1 according to the present embodiment, the inrush current generated when the braking by the brakers 214-1 to 214-6 for a plurality of axes is released is suppressed, so that it is possible to prevent the occurrence of a situation where the current in use exceeds the allowable current value of power source.

Here, it is possible to reduce the resistance component of the conductive wire by increasing the number of conductive wires or increasing the thickness of the conductive wires, but the occupancy rate of the conductive wires in the joint piping of the robot increases. As a result, it may be necessary to thicken the joints of the robot or the movable range of the arm may narrow down.

Therefore, a configuration in which the overexcitation timing is adjusted as in the present embodiment is considered preferable. In the robot system 1 according to the present embodiment, it is possible to relatively reduce the number of wires for releasing the braking by the brakers 214-1 to 214-6.

In the robot system 1 according to the present embodiment, when the robot control device 30 and each of the braking control devices 212-1 to 212-6 have specifications for communication by CAN, it is possible to control the brakers 214-1 to 214-6 by utilizing the communication of CAN and it is possible to economize wiring, for example.

Configuration Examples

One configuration example is a robot system 1 including the robot 20 and the control device controlling the robot 20.

The robot system. 1 is configured as follows. In the embodiment, the control device is the robot control device 30.

The control device includes the power supplier 115 and the main controller 116.

The robot 20 includes a first drive portion, a first braker braking the first drive portion, a second drive portion, a second braker braking the second drive portion, a first controller releasing, by supply of a current from the power supplier 115, the braking of the first drive portion by the first braker, and a second controller releasing, by supply of a current from the power supplier 115, the braking of the second drive portion by the second braker.

The main controller 116 causes the first controller to release the braking by the first braker and causes the second controller to release the braking by the second braker.

A power line 231 coupling the power supplier 115, the first controller, and the second controller to each other is in a daisy chain coupling.

The first release timing at which the first controller releases the braking by the first braker is different from the second release timing at which the second controller releases the braking by the second braker.

Here, each of the drive portions 211-1 to 211-6 is an example of the first drive portion or the second drive portion. Each of the brakers 214-1 to 214-6 is an example of the first braker or the second braker. Each of the braking control devices 212-1 to 212-6 is an example of the first controller or the second controller.

In the example of FIGS. 6 and 7, the first drive portion, the first braker, and the first controller, and the second drive portion, the second braker, and the second controller are combinations of the drive portions 211-1 to 211-6, the brakers 214-1 to 214-6, and the brake control devices 212-1 to 212-6 in any two axes, not two axes among J2, J3, and J6, nor two axes of J1 and J5.

In the example of FIGS. 8 and 9, the first drive portion, the first braker, and the first controller, and the second drive portion, the second braker, and the second controller are combinations of the drive portions 211-1 to 211-6, the brakers 214-1 to 214-6, and the braking control devices 212-1 to 212-6 in any two axes.

In the example of FIGS. 10 and 11, the first drive portion, the first braker, and the first controller, and the second drive portion, the second braker, and the second controller are combinations of the drive portion 211-1 to 211-6, the braker 214-1 to 214-6, and the braking control devices 212-1 to 212-6 in any two axes.

One configuration example is a robot system 1 having the following configuration.

The first controller controls, after the first release timing, the first reduction timing at which the supply of the current from the power supplier 115 is reduced. The second controller controls, after the second release timing, the second reduction timing at which the supply of the current from the power supplier 115 is reduced. The period between the first release timing and the first reduction timing overlaps with a part of the period between the second release timing and the second reduction timing.

Here, this example is the example of FIGS. 8 and 9, or the example of FIGS. 10 and 11. In this case, the period between the first release timing and the first reduction timing or the period between the second release timing and the second reduction timing is an overexcitation period.

One configuration example is a robot system. 1 having the following configuration.

The second controller is coupled to the first controller in a daisy chain coupling. The first controller is coupled to the power supplier 115 in a daisy chain coupling. The second release timing is earlier than the first release timing.

Here, this example is the example of FIGS. 6 and 7 or the example of FIGS. 8 and 9. In this case, examples of the first drive portion, the first braker, and the first controller are the drive portion 211-1, the braker 214-1, and the braking control device 212-1 of J1 and examples of the second drive portion, the second braker, and the second controller are the drive portion 211-2, the braker 214-2, and the braking control device 212-2 of J2.

One configuration example is a robot system. 1 having the following configuration.

The robot 20 includes a third drive portion, a third braker braking the third drive portion, and a third controller releasing the braking of the third drive portion by the third braker through a supply of the current from the power supplier 115.

The main controller 116 causes the third controller to release the braking by the third braker.

The power line 231 is coupled to the third controller by daisy chain coupling.

The first release timing is the same as the third release timing at which the third controller releases the braking by the third braker.

Here, this example is the example of FIGS. 6 and 7. In this case, the first drive portion, the first braker, the first controller, the third drive portion, the third braker, and the third controller are combinations of the drive portions 211-1 to 211-3 and 211-5 to 211-6, the brakers 214-1 to 214-3 and 214-5 to 214-6, and the braking control devices 212-1 to 212-3 and 212-5 to 212-6 in two axes among J2, J3, and J6 or two axes of J1 and J5.

One configuration example is a robot system. 1 having the following configuration.

The control device is positioned inside the robot 20.

In the present embodiment, a configuration example of the robot system 1 is shown and may be realized as a robot control method which is a control method of the robot 20 in the robot system 1.

Second Embodiment

A second embodiment will be described.

Figure 12:
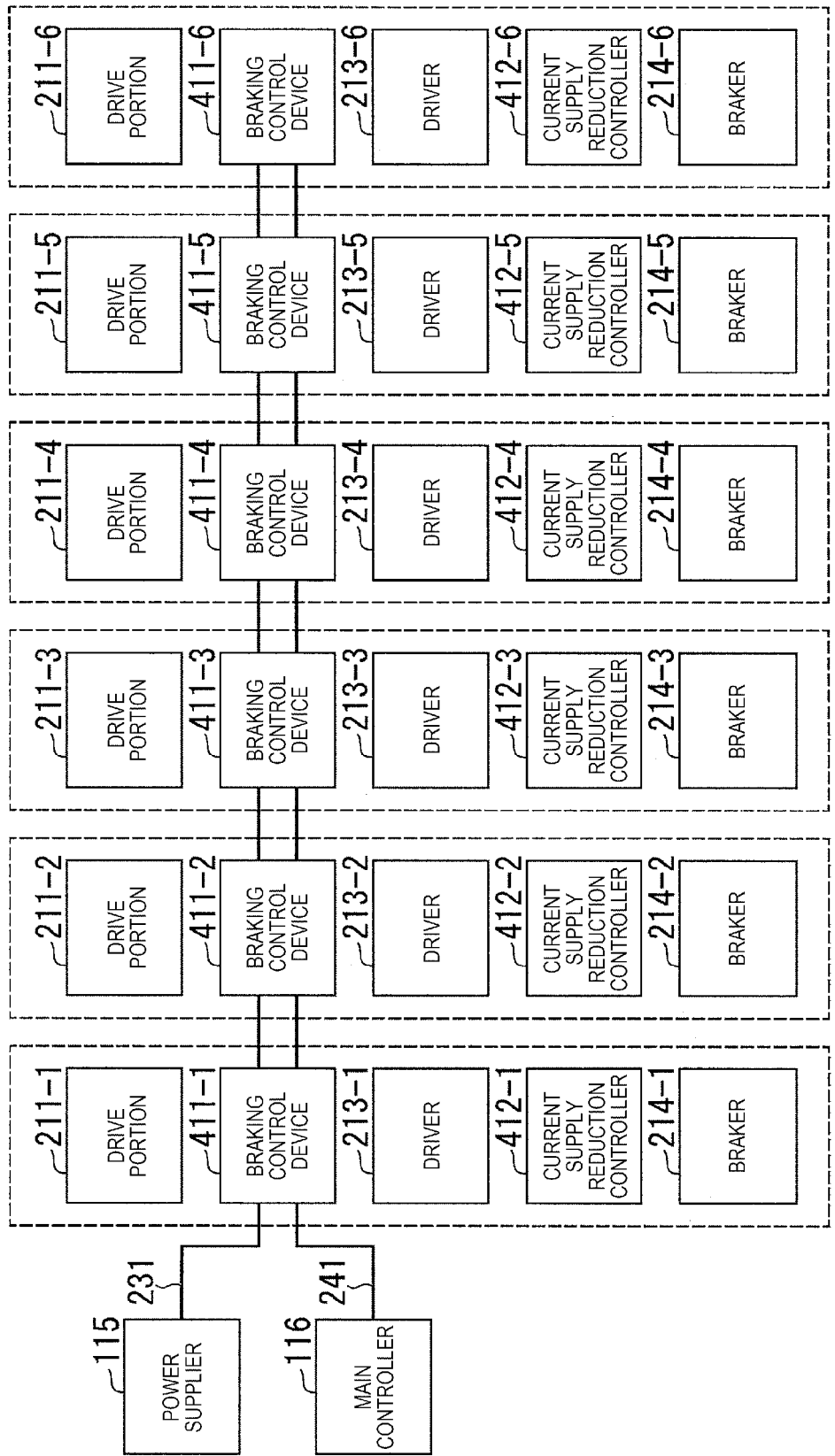
FIG. 12 is a view showing a configuration related to driving of six axes according to a second embodiment.

FIG. 12 is a view showing a configuration related to driving of six axes according to the second embodiment.

For each of the six axes, the robot 20 includes the drive portions 211-1 to 211-6, braking control devices 411-1 to 411-6, the drivers 213-1 to 213-6, the current supply reduction controllers 412-1 to 412-6, the brakers 214-1 to 214-6, the power line 231, and the communication line 241.

Here, in the example of FIG. 12, the power supplier 115, the main controller 116, the drive portions 211-1 to 211-6, the drivers 213-1 to 213-6, the brakers 214-1 to 214-6, the power line 231, and the communication line 241 are the same as those shown in FIG. 3 respectively and, in the present embodiment, are denoted by the same reference numerals as those in the example of FIG. 3. A detailed description thereof will be omitted.

In the example of FIG. 12, the braking control devices 411-1 to 411-6 and the current supply reduction controllers 412-1 to 412-6 are provided separately for each axis. That is, in the example of FIG. 3, to take an example of J1, the function of the current supply reduction controller 332 is integrated into the braking control device 212-1, but these are separate in the example of FIG. 12.

Further, a difference is that, in the example of FIG. 12, the current supply reduction controllers 412-1 to 412-6 periodically reduce the magnitude of the current a plurality of times while the current supply reduction controller 332 in the example of FIG. 3 is configured to reduce the magnitude of the current once.

Functional Configuration of Braking Control Device

In the present embodiment, the motions performed by the braking control devices 411-1 to 411-6 of the six axes are the same. Therefore, the braking control device 411-1 of one axis will be described as a representative.

Figure 13:
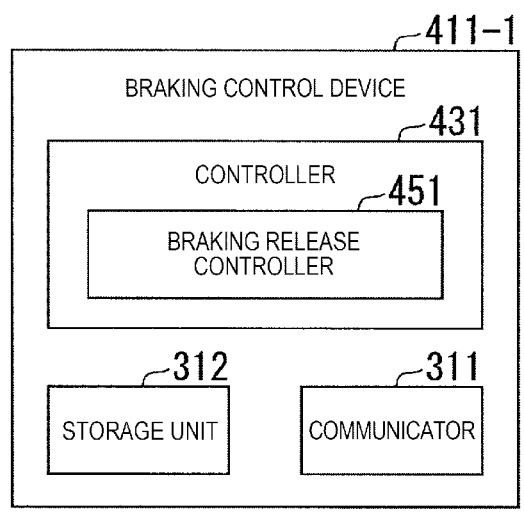
FIG. 13 is a view showing a functional configuration of a braking control device according to the second embodiment.

FIG. 13 is a view showing a functional configuration of the braking control device 411-1 according to the second embodiment.

The braking control device 411-1 includes the communicator 311, the storage unit 312, and a controller 431.

The controller 431 includes a braking release controller 451.

Here, in the example of FIG. 13, the communicator 311 and the storage unit 312 are respectively the same as those shown in FIG. 4 and, in the present embodiment, are denoted by the same reference numerals as in the example of FIG. 4. Detailed descriptions thereof will be omitted.

The braking release controller 451 of the controller 431 has the same function as the braking release controller 331 shown in FIG. 4.

In other words, the controller 431 performs the same motion as the controller 313 shown in FIG. 4 except the motion by the function of the current supply reduction controller 332 shown in FIG. 4.

In the example of FIG. 12, after a current having the magnitude equal to or greater than a predetermined threshold value flows through the breaker 214-1 and the breaking release controller 451 releases the braking by the braker 214-1, the current supply reduction controller 412-1 periodically performs controls a plurality of times so as to reduce the magnitude of the current for J1. In this way, the magnitude of the current is periodically raised and lowered so that a predetermined value equal to or greater than the predetermined threshold value and a predetermined value less than the predetermined threshold value are alternately realized.

The same applies to J2 to J6 as in J1.

In the example of FIG. 12, the state in which the magnitude of the current is equal to or greater than the predetermined threshold value periodically recurs, so that, each time the state is reached, the total value of the current values of the currents flowing through the six brakers 214-1 to 214-6 of J1 to J6 is adjusted so as to be equal to or less than a predetermined upper limit value.

In the example of FIG. 12, the main controller 116 of the robot controller 30 controls so that such adjustment is performed.

Further, for each axis, when a predetermined period elapses since the magnitude of the current reached a predetermined value equal to or greater than the predetermined threshold value, the current supply reduction controllers 412-1 to 412-6 first reduce the magnitude of the current for a predetermined period, for example. Thereafter, the current supply reduction controllers 412-1 to 412-6 periodically reduce the magnitude of the current for a predetermined period.

Here, the example of FIG. 12 shows a case where the control is performed, in each axis, in order of the braking control devices 411-1 to 411-6, the drivers 213-1 to 213-6, the current supply reduction controllers 412-1 to 412-6, and the brakers 214-1 to 214-6.

Regarding Second Embodiment

As described above, in the robot system 1 according to the present embodiment, the current supply reduction controllers 412-1 to 412-6 and the braking control devices 411-1 to 411-6 are provided separately and, like in the first embodiment, the control timing of the brakers 214-1 to 214-6 is adjusted in the robot control device 30.

In the present embodiment, it is possible to use existing devices as the current supply reduction controllers 412-1 to 412-6, for example.

Also in the robot system 1 according to the present embodiment, it is possible to obtain the same effects as in the first embodiment.

Configuration Example

One configuration example is a robot system 1 having the following configuration.

The first controller, the second controller, or the third controller is configured with combinations of the braking control devices 411-1 to 411-6 of the corresponding axis and the current supply reduction controllers 412-1 to 412-6 of the corresponding axis.

Third Embodiment

A third embodiment will be described.

Figure 14:
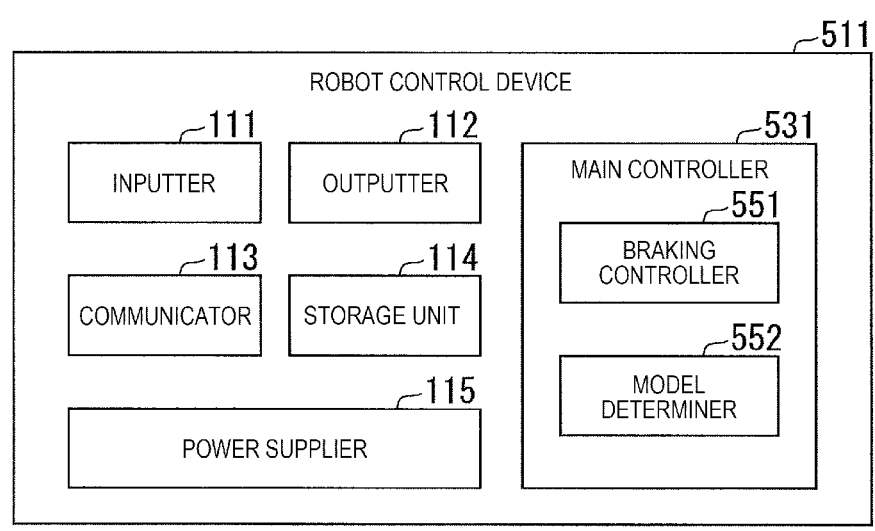
FIG. 14 is a view showing a functional configuration of a robot control device according to a third embodiment.

FIG. 14 is a view showing a functional configuration of a robot control device 511 according to the third embodiment.

The robot control device 511 includes the inputter 111, the outputter 112, the communicator 113, the storage unit 114, the power supplier 115, and a main controller 531.

The main controller 531 includes a braking controller 551 and a model determiner 552.

Here, in the example of FIG. 14, the inputter 111, the outputter 112, the communicator 113, the storage unit 114, and the power supplier 115 are the same as those shown in FIG. 2 and are denoted by the same reference numerals as those in the example of FIG. 2. The detailed description thereof will be omitted.

The main controller 531 has a processor. The main controller 531 performs various controls on the robot 20.

The braking controller 551 controls the brakers 214-1 to 214-6 included in the robot 20. In the present embodiment, the braking controller 551 controls the brakers 214-1 to 214-6 in a manner of releasing the braking by the brakers 214-1 to 214-6 at the timing appropriate for the corresponding model for each of a plurality of models of the robot 20.

The model determiner 552 determines the model of the robot 20 to be controlled by the robot control device 511. The braking controller 551 adopts the model determined by the model determiner 552.

Figure 15:
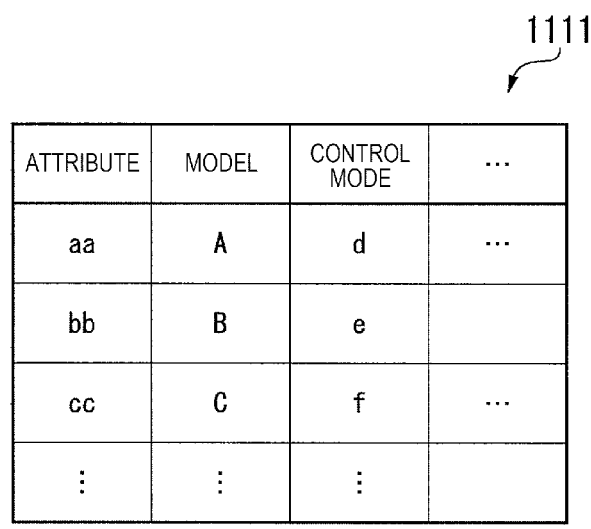
FIG. 15 is a view showing a model information table according to the third embodiment.

FIG. 15 is a view showing a model information table 1111 according to the third embodiment.

In the present embodiment, the model information table 1111 is stored in the storage unit 114.

The model information table 1111 stores information for specifying an attribute, information for specifying the model, and information for specifying a control mode in association with each other.

Various attributes may be used as an attribute. For example, the name of the robot 20 or the type of the robot 20 may be used. In the present embodiment, one or more types of attributes that can specify the model of the robot 20 may be used.

The model represents the model of the robot 20. In the present embodiment, the number of brakers to be controlled by the braking controller 551 and an appropriate mode of control are uniquely determined for each model of the robot 20. When the model itself is used as an attribute, the attribute and the model may be commonized, for example.

The control mode represents a control mode appropriate for each model regarding the control of the braker of the robot 20. The control mode may include the timing at which the braking by the braker is released and the value of the current flowing through the braker, for example.

An example is the model determiner 552 that communicates with the robot 20 coupled to the robot control device 511 by the communicator 113 and thereby receives information specifying an attribute from the robot 20. Then, based on the model information table 1111, the model determiner 552 determines the model corresponding to the attribute specified by the received information.

Another example is the model determiner 552 that inputs, through the inputter 111, information representing the content of the operation performed by the user and specifies an attribute of the robot 20 by the input information. Then, based on the model information table 1111, the model determiner 552 determines the model corresponding to the specified attribute. In this case, the user inputs the information specifying the attribute of the robot 20 by the operation.

In this way, the model determiner 552 may determine automatically or may determine in accordance with the operation performed by the user, the model of the robot 20.

Based on the model information table 1111, the braking controller 551 specifies a control mode corresponding to the model determined by the model determiner 552. Then, the braking controller 551 controls the brakers 214-1 to 214-6 of the robot 20 in the specified control mode.

In the present embodiment, one or more models among a plurality of models determined by the model determiner 552 include a plurality of brakers requiring overexcitation and holding excitation controls.

Regarding Third Embodiment

In the robot system 1 according to the present embodiment, it is possible to switch the control mode of the brakers 214-1 to 214-6 to a control mode appropriate for each one of a plurality of models of the robot 20 that can be coupled to each other in the robot control device 30. In this way, in the robot control device 30, it is possible to suppress the peak of the current flowing through the power line 231 in an optimal control mode for each model of the robot 20, for example. Such robot control device 30 can deal with a variety of robots 20 and improves usability.

In the robot system 1 according to the present embodiment, it is possible to reduce the size of the power source included in the robot control device 30, thereby downsize the robot control device 30, thin the wire materials inside the robot 20, and economize wiring inside the robot 20.

Here, in the related art, in order to match all robots, the robot control device was provided with a high-current power source appropriate for a big robot, resulting in large size and high cost of the robot control device. Further, in the related art, in the robot control device, the power source capacity was selected to match a model of which the inrush current generated when the braking by the braker is released was the highest, or a thick wire material was selected to suppress the voltage drop in some cases. As compared to these, in the robot system 1 according to the present embodiment, it is possible to reduce the size and the cost.

Fourth Embodiment

A fourth embodiment will be described.

The present embodiment is different from the first embodiment in the configuration and the motion in which the robot control device 30 transmits in advance, to the braking control devices 212-1 to 212-6, the information on timing at which the braking by the brakers 214-1 to 214-6 is controlled, and other configurations and motions are the same.

In the present embodiment, for the convenience of description, the same reference numerals as those used in the first embodiment are used for description and detailed description of the same parts as those in the first embodiment will be omitted.

Further, in the present embodiment, the motions performed by the braking control devices 212-1 to 212-6 of the six axes are the same. Therefore, the braking control device 212-1 of one axis will be described as a representative.

Figure 16:
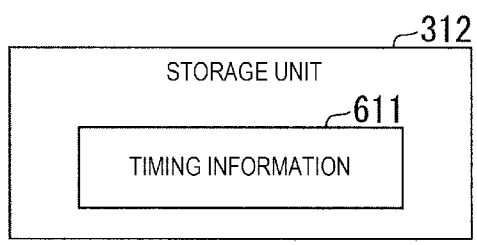
FIG. 16 is a view showing an example of information stored in a storage unit of a braking control device according to a fourth embodiment.

FIG. 16 is a view showing an example of information stored in the storage unit 312 of the braking control device 212-1 according to the fourth embodiment.

In the present embodiment, predetermined timing information 611 is stored in the storage unit 312 of the braking control device 212-1.

The timing information 611 specifies the timing from when the braking control device 212-1 receives, from the robot control device 30, a signal of a command to release the braking by the braker 214-1 to when processing according to the received signal is executed.

In other words, the braking control device 212-1 receives, from the robot control device 30, a signal of a command to release the braking by the braker 214-1, and then, executes processing according to the received signal at the timing specified by the timing information 611.

Here, in the present embodiment, the robot control device 30 transmits the timing information 611 to the braking control device 212-1 before controlling the braking by the braker 214-1. The braking control device 212-1 receives the timing information 611 transmitted from the robot control device 30 and stores the timing information 611 in the storage unit 312. Then, the robot control device 30 transmits a signal to control the braking by the braker 214-1 to the braker 214-1 at a timing in consideration of the timing information 611. The timing in consideration of the timing information 611 is a timing on the premise that a delay in responding to the timing information 611 occurs in the braking control device 212-1.

Another example is the timing information 611 that may be stored in the storage unit 312 of the braking control device 212-1 by a user, for example.

Various timings, when the power of the robot control device 30 is turned on, for example, may be used as the timing at which the timing information 611 is stored in the storage unit 312 of the braking control device 212-1.

Here, the present embodiment shows a case where the adjustment of the control timing by the braking control devices 212-1 to 212-6 based on the timing information 611 is applied to the configuration of the first embodiment, and it is also possible to apply to the configuration of the second embodiment or to the configuration of the third embodiment.

Regarding Fourth Embodiment

As described above, in the robot system 1 according to the present embodiment, it is possible to adjust the control timing of the brakers 214-1 to 214-6 in the braking control devices 411-1 to 411-6.

In the present embodiment, it is possible to reduce the burden of adjusting the control timing of the brakers 214-1 to 214-6 performed by the robot control device 30.

Even in the robot system 1 according to the present embodiment, it is possible to obtain the same effect as in the first embodiment.

In this way, a configuration in which the main controllers 116 and 531 of the robot control device 30 issue release timing commands may be used, or the release timing may be realized based on the information for realizing the release timing stored by the braking control devices 411-1 to 411-6. The information may be information specifying a lapsed time from the receipt of a command from the main controllers 116 and 531 to the release.

Regarding Above Embodiments

In the above embodiments, various modes of robots may be used as the robot 20. A wall suspension type, a ceiling suspension type, a stationary type on a floor, or the like may be used, for example.

In the above embodiments, the robot 20 may not be a vertically articulated robot and may be a SCARA robot, for example. Further, the robot 20 may be an industrial robot, for example, or may be another robot.

In the above embodiments, the robot 20 and the robot control device 30 do not have to be integrated and separate configurations may be used.

In the above embodiments, various topologies may be used as the wiring topology.

A program for realizing a function of any component in any device such as the devices described above may be stored in a non-transitory computer-readable storage medium, and the program may be read into a computer system for execution. The "computer system" mentioned here includes an operating system (OS) or a hardware such as peripheral devices. Further, the "non-transitory computer-readable storage medium" refers to a storage device such a portable medium like a flexible disk, a magneto-optical device, ROM, compact disc ROM (CD-ROM), and the like, and a hardware built in a computer system. Further, the "non-transitory computer-readable storage medium" includes what holds a program for a certain period of time, such as a volatile memory inside a computer system that becomes a server or a client when a program is transmitted through a network such as the internet or a communication line such as a telephone line.

The volatile memory is a RAM, for example.

Further, the program described above may be transmitted from a computer system storing the program in a storage device to another computer system through a transmission medium or by a transmission wave in the transmission medium. Here the "transmission medium" for transmitting the program refers to a medium having a function of transmitting information like a network such as an internet or a communication line such as a telephone line.

Further, the program described above may be for realizing a part of the functions described above. Further, the program described above may be a so-called differential file that can realize the functions described above in a combination with a program already stored in the computer system.

The embodiments of the present disclosure are described in detail with reference to the drawing above, and the specific configuration is not limited to the embodiments and includes designs or the like within range not deviating from the spirit of the present disclosure.

What is claimed is:

1. A robot system comprising:
a robot; and
a control device controlling the robot, wherein
the control device includes
a power supplier, and
a main controller,
the robot includes
a first drive portion,
a first braker braking the first drive portion,
a second drive portion,
a second braker braking the second drive portion,
a first controller releasing the braking of the first drive portion by the first braker through a supply of a current from the power supplier, and
a second controller releasing the braking of the second drive portion by the second braker through a supply of a current from the power supplier,
the main controller causes the first controller to release the braking by the first braker and causes the second controller to release the braking by the second braker,
a power line coupling the power supplier, the first controller, and the second controller to each other is in a daisy chain coupling, and
a first timing at which the first controller releases the braking by the first braker is different from a second timing at which the second controller releases the braking by the second braker.

2. The robot system according to claim 1, wherein
the first controller controls, after the first release timing, a first reduction timing to reduce a supply of a current from the power supplier,
a second controller controls, after the second release timing, a second reduction timing to reduce a supply of a current from the power supplier, and
a period between the first release timing and the first reduction timing overlaps with a part of a period between the second release timing and the second reduction timing.

3. The robot system according to claim 1, wherein
the second controller is coupled to the first controller in the daisy chain coupling,
the first controller is coupled to the power supplier in the daisy chain coupling, and
the second release timing is earlier than the first release timing.

4. The robot system according to claim 1, wherein the robot includes:
a third drive portion;
a third braker braking the third drive portion;
a third controller releasing the braking of the third drive portion by the third braker through a supply of a current from the power supplier, wherein
the main controller causes the third controller to release a braking by the third braker,
the power line is coupled to the third controller by the daisy power coupling, and
the first release timing is the same as a third release timing at which the third controller releases the braking by the third braker.

5. The robot system according to claim 1, wherein
the control device is positioned inside the robot.

6. A robot control method in a robot system including a robot and a control device controlling the robot, in which the control device includes a power supplier and a main controller, the robot includes a first drive portion, a first braker braking the first drive portion, a second drive portion, a second braker braking the second drive portion, a first controller releasing the braking of the first drive portion by the first braker through a supply of a current from the power supplier, and a second controller releasing the braking of the second drive portion by the second braker through a supply of a current from the power supplier, wherein the main controller causes the first controller to release the braking by the first braker and causes the second controller to release the braking by the second braker, a power line coupling the power supplier, the first controller, and the second controller to each other is in a daisy chain coupling, and a first release timing at which the first controller releases the braking by the first braker is different from a second release timing at which the second controller releases the braking by the second braker.

7. The robot control method according to claim 6, wherein the first controller controls, after the first release timing, a first reduction timing to reduce a supply of a current from the power supplier, the second controller controls, after the second release timing, a second reduction timing to reduce a supply of a current from the power supplier, and a period between the first release timing and the first reduction timing overlaps with a part of a period between the second release timing and the second reduction timing.

8. The robot control method according to claim 6, wherein the second controller is coupled to the first controller in a daisy chain coupling, the first controller is coupled to the power supplier in a daisy chain coupling, and the second release timing is earlier than the first release timing.

9. The robot control method according to claim 6, wherein the robot includes a third drive portion, a third braker braking the third drive portion, and a third controller releasing the braking of the third drive portion by the third braker through a supply of a current from the power supplier, the main controller causes the third controller to release the braking by the third braker, the power line is coupled to the third controller by a daisy chain coupling, and the first release timing is the same as a third release timing at which the third controller releases the braking by the third braker.

* * * * *